Dec. 12, 1967 G. J. DEELMAN 3,358,217
VOLTAGE REGULATING CIRCUIT UTILIZING PHOTOELECTRIC CONTROL
Filed June 29, 1964
2 Sheets-Sheet 1

INVENTOR
GERARDUS JACOBUS DEELMAN
BY
Frank R. Trifari
AGENT

Dec. 12, 1967 G. J. DEELMAN 3,358,217
VOLTAGE REGULATING CIRCUIT UTILIZING PHOTOELECTRIC CONTROL
Filed June 29, 1964 2 Sheets-Sheet 2

INVENTOR.
GERARDUS JACOBUS DEELMAN
BY
Frank R. Trifari
AGENT

United States Patent Office 3,358,217
Patented Dec. 12, 1967

3,358,217
VOLTAGE REGULATING CIRCUIT UTILIZING PHOTOELECTRIC CONTROL
Gerardus Jacobus Deelman, Eindhoven, Netherlands, assignor to North American Philips Company, Inc., New York, N.Y., a corporation of Delaware
Filed June 29, 1964, Ser. No. 378,785
Claims priority, application Netherlands, July 1, 1963, 294,802; Apr. 10, 1964, 64—3,855
14 Claims. (Cl. 323—21)

ABSTRACT OF THE DISCLOSURE

A voltage regulating circuit utilizes a controlled rectifier in series with the load and a phase shift network connected to the control electrode of the rectifier to automatically adjust the firing angle of the rectifier to maintain the load voltage constant. The phase shift network includes a photosensitive resistor that is optically coupled with a light source connected across the load. A variation in load voltage produces a change in the light output which in turn varies the resistance of the photosensitive element. The phase shift network produces a control voltage that alters the firing angle of the controlled rectifier in a sense to counteract the variation in load voltage.

---

The invention relates to a circuit arrangement for obtaining a stabilized supply voltage from an alternating-voltage source with the aid of a rectifier controlled by means of a phase-shifting network, the voltage derived from the rectifier being applied to the load. It is an object of the invention to provide a simple and efficient circuit arrangement in which both slow and comparatively rapid variations in the load or the supply voltage are compensated for. According to the invention, the load circuit includes a light-emitting element illuminating a photosensitive resistor connected in the phase shifting network so that a variation in the amount of light emitted by the light-emitting element causes the phase and/or the amplitude of the ignition voltage of the rectifier to be varied so that the resulting variation in the voltage derived from the rectifier counteracts the cause of the variation in the amount of light emitted.

In particular, the light-emitting element may be a gas-discharge tube included in a circuit connected in parallel with the load. A gas-discharge tube by its nature is a stabilizing element. Its light output considerably increases with increase in the current through it while the voltage remains substantially constant. However, instead of a gas-discharge tube included in a circuit connected in parallel with the load, a Zener diode connected in series with an electric filament lamp may be used. In this case, not only is the current through the Zener diode highly dependent upon the direct voltage across it, but also the amount of light emitted by a filament lamp is substantially proportional to the fifth power of the current through the lamp. Thus the series combination of a filament lamp and a Zener diode provides an addition of effects.

Obviously the Zener diode may be replaced by a resistor.

According to a further aspect of the invention, to increase the sensitivity of the circuit arrangement the phase shifting network may be so designed that the control voltage of the controlled rectifier is constituted by two voltage components which are substantially equal in magnitude but differ in phase by approximately 180°. Slight variations in the amount of emitted light and hence slight variations in voltage suffice to produce considerable variations in the phase and amplitude of the control voltage for the rectifier and consequently to compensate for the voltage variaitions.

The light-emitting element is advantageously included in an amplifier stage the input voltage of which is taken from a voltage divider connected across the load. In particular, the input voltage is a small fraction of the voltage across the voltage divider, the control electrode of the amplifying element in the amplifier stage being connected to the tapping on the voltage divider through a voltage stabilizing element.

In order that the invention may readily be carried into effect, embodiments thereof will now be described, by way of example, with reference to the accompanying drawings, in which.

Figure 1:
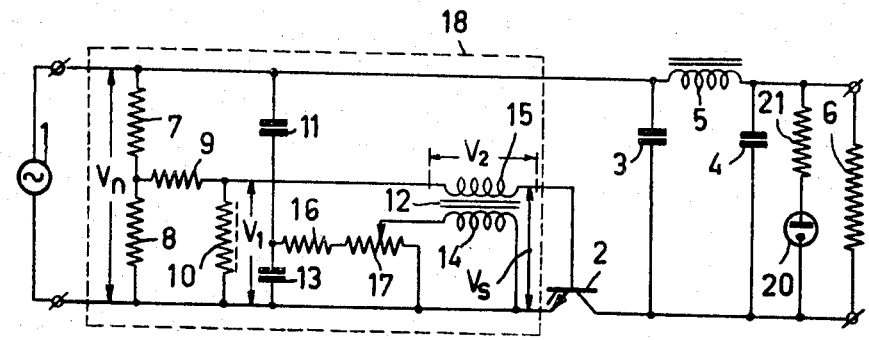
FIG. 1 is a circuit diagram of a circuit arrangement in accordance with the invention.

In the circuit arrangement shown in FIG. 1, the voltage supplied by an alternating voltage source 1 is rectified by means of a controlled rectifier 2, which preferably is a pnpn semi-conductor device but may be a thyratron. The voltage is filtered by a filter comprising capacitors 3 and 4 and a choke coil 5 and then applied to a load 6. The voltage required to control the rectifier 2 is obtained by means of a phase shifting network 18. This network comprises resistors 7, 8 and 9 and the secondary winding 15 of a transformer 12. The series combination of the resistors 7 and 8 is connected across the voltage source 1. The junction point of the resistors 7 and 8 is connected to the base of the pnpn rectifier 2 via a resistor 9 and the secondary winding 15. According to the invention, the phase-shifting network includes a photosensitive resistor 10 which is illuminated by a gas-discharge tube 20 included in the load circuit. The photosensitive resistor 10 is connected between the junction point of the resistor 9 and the secondary 15 on the one hand, and the control electrode of the controlled rectifier 2 on the other hand.

The series combination of the gas discharge tube 20 and a resistor 21 is connected across the load 6.

The circuit arrangement operates as follows. The control voltage $V_S$ of the controlled rectifier 2 varies in response to a variation in the amount of light emitted by the gas discharge tube 20, and hence with a variation of the voltage across the load 6 both in amplitude and in phase. This is illustrated by the diagrams of FIG. 2. The control voltage $V_S$ consists of the sum of the voltage $V_1$ across the photosensitive resistor 10 and the voltage $V_2$ across the secondary 15 of the transformer 12. The voltage $V_1$ is substantially in phase with the supply voltage $V_n$ owing to the provision of the resistive voltage divider 7, 8 and the resistor 9. The voltage $V_2$ lags more than 90° with respect to the supply voltage $V_n$ by the provision of the series combination of a comparatively large capacitor 11 and a comparatively small resistor constituted by a voltage divider 16, 17. A variable tapping on resistor 17 is connected to the primary winding 14 of the transformer 12. A capacitor 13 connected across the voltage divider 16, 17 serves to suppress the third harmonic of the alternating voltage, thus preventing distortion of the sinusoidal voltage $V_2$.

Figure 2A:
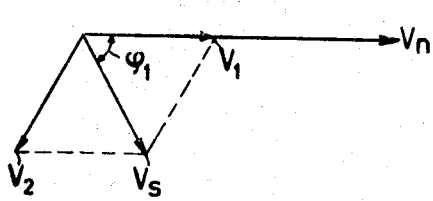
FIGS. 2, 4, 6 and 8 are diagrams illustrating the operation of the circuit arrangements and networks shown in FIGS. 1, 3, 5 and 7.
Figure 2B:
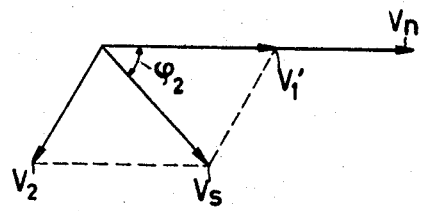

In FIG. 2a the voltages $V_1$, $V_2$ and $V_S$ are plotted with correct amplitude and phase for the mean value of the supply voltage $V_n$. When the voltage $V_n$ and hence the voltage across the load 6 vary, the voltage across the gas discharge tube 20 also varies. In particular, when the voltage $V_n$ decreases, the voltage across the gas-discharge tube 20 and hence the amount of light emitted also decrease. As a result the resistance value of the photosensitive resistor increases, and hence the voltage $V_1$ across the resistor, which together with the resistor 9 forms a voltage divider, also increases. Consequently, the phase angle $\varphi$ ($\varphi_1$ in FIG. 2a) decreases (to $\varphi_2$ in FIG. 2b). In other words, the control voltage $V_s$ lags to a lesser degree with respect to the supply voltage $V_n$. This means that the instant at which the rectifier 2 becomes conducting is advanced so that the rectifier is conducting for a greater part of each cycle of the supply voltage. Hence the voltage across the load 6 increases.

Similarly the phase angle $\varphi$ increases with increase in the supply voltage $V_n$, with the result that the instant at which the rectifier 2 becomes conducting is retarded so that the voltage across the load 6 decreases.

In a practical embodiment the values of the resistors 7, 8 and 9 were 10K ohms, 2K ohms and 10 ohms, respectively. The resistors 16 and 17 were 1K ohm and 250 ohms, respectively. The capacitors 3, 4, 11 and 13 were 300 μf., 100 μf., 0.5 μf. and 1 μf., respectively.

The resistor 21 was 20K ohms and the load resistor 6 was 250K ohms. The gas-discharge tube 20 was of an experimental type, as was the photosensitive resistor 10. The mean voltage $V_n$ was 220 v. and the voltage $V_2$ was about 1.5 v.

When the alternating voltage $V_n$ varied between 200 v. and 240 v. the direct voltage across the load 6 remained constant at 250 v. with a few V.

Figure 9:
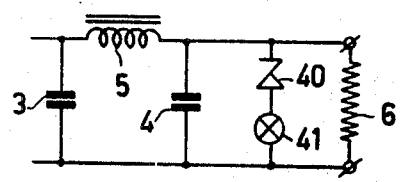
FIG. 9 is a modification of part of the circuit arrangement shown in FIG. 1.

The series combination of the gas-discharge tube 20 and the resistor 21 may be replaced by the series combination of a Zener diode and a filament lamp. FIG. 9 shows this modification. The series combination of a Zener diode 40 and a filament lamp 41 is connected in parallel with the load 6. If desired, a resistor may be substituted for the Zener diode.

The phase shifting network may have one of a large variety of designs. According to the invention the phase shifting network 18 is preferably so designed that the control voltage for the rectifier 2 is constituted by two voltage components of substantially equal amplitude but differing in phase by approximately 180°.

Figure 3:
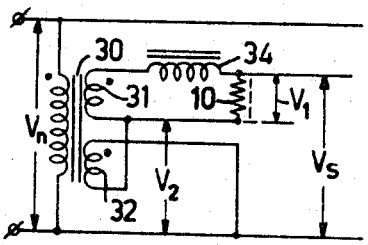
FIGS. 3, 5 and 7 illustrate phase-shifting networks in accordance with a preferred aspect of the invention.

FIG. 3 shows an example of such a network. The supply voltage is applied to a transformer 30 having two secondary windings 31 and 32 consisting of substantially equal numbers of turns. One end of the photosensitive resistor 10 is directly connected to the junction of the two secondary windings 31 and 32 and the other end is connected through a choke coil 34 to the end of the winding 31 remote from the said junction.

Figure 4:
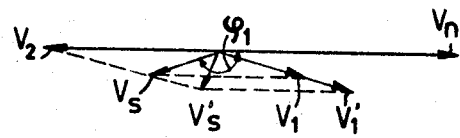

The winding sense of the secondary 32 is such that the voltage $V_2$ across this winding has a sense opposite to that of the supply voltage $V_n$ whereas the winding sense of the secondary between the points 32 and 31 is such that the voltage across this portion is in phase with the supply voltage. Owing to the provision of the choke 34 the voltage across the photosensitive resistor 10 is slightly shifted in phase with respect to $V_n$. Consequently the voltages $V_1$ and $V_2$ are substantially equal in amplitude but differ in phase by nearly 180°. FIG. 4 clearly shows that a slight variation in $V_1$ produces a considerable variation in the phase difference between $V_n$ and $V_s$. Hence the instant at which the rectifier becomes conducting will change in response to relatively minute variations in the amplitude of $V_1$. This means that even with a minute variation in the amount of light emitted by the gas-discharge tube, variations in the amplitude of the output voltage are compensated for. The circuit arrangement of FIG. 3 replaces the portion of FIG. 1 surrounded by the broken line 18. The junction of choke coil 34 and photosensitive resistor 10 is connected to the control electrode of the rectifier 2 (not shown in FIG. 3).

Figure 5:
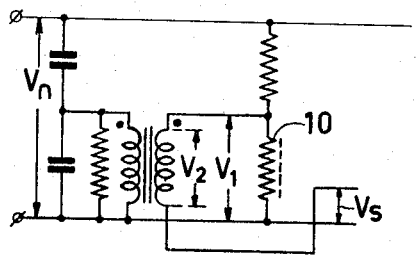
Figure 6:
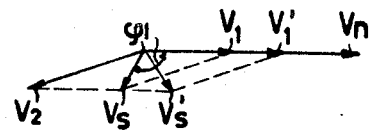
Figure 7:
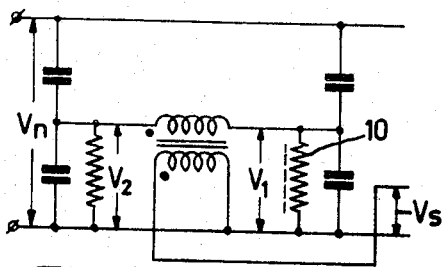
Figure 8:
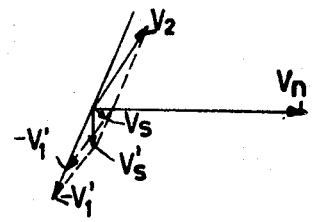

FIGS. 5 and 7 show modified embodiments of the phase shifting network shown in FIG. 3. FIGS. 6 and 8 show the associated phase diagrams of the relevant voltages in the respective networks.

Frequently it may be desirable to compensate for the consequences of aging of the light-emitting element. A suitable circuit arrangement is shown in FIG. 10.

Figure 10:
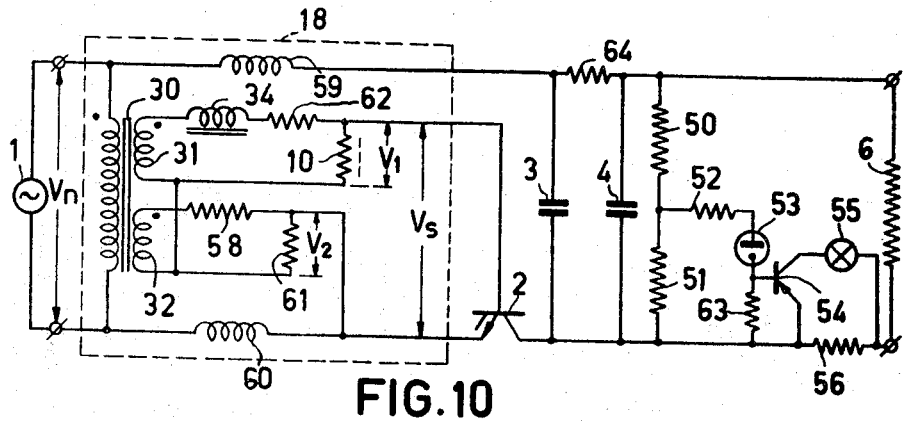
FIG. 10 is a circuit diagram of another circuit arrangement in accordance with the invention.

In FIG. 10 like circuit elements are designated by the same reference numerals as in FIG. 1 and, with respect to the phase-shifting network, as in FIG. 3.

The voltage across a resistor 63, which is the base emitter voltage of a transistor 54 connected in common emitter arrangement, is negligible with respect to the voltage across the load 6 because the gas-discharge tube 53 represents a high impedance. Hence the voltage across the load 6 is approximately determined by the voltage across resistors 50 and 51 constituting the voltage divider 50, 51 and by the voltage across the gas-discharge tube 53.

A small variation in the base emitter voltage of the transistor 54 produced by a variation in the voltage across the load 6 entails a large variation in the collector current and hence in the amount of light emitted by a lamp 55 connected in the collector circuit of the transistor 54. The lamp 55 illuminates the photosensitive resistor 10 in the phase-shifting network 18. The voltage variation across the load 6 is compensated for in the aforementioned manner.

If with a constant voltage across the load 6 and hence with a constant current through the lamp 55 the amount of emitted light is varied by aging, the value of photosensitive resistance 10 is also changed. As a result, the control voltage $V_s$ of the control rectifier 2 and hence the voltage across the load 6 vary. This results in a variation of the current through the gas-discharge tube 53 and hence of the base-emitter voltage of the transistor 54 and consequently of the collector current of the transistor 54. In particular, with a decrease in the amount of emitted light the collector current increases. As a result the voltage across the load 6 returns to its initial value.

This may also be expressed in the following way: the base emitter voltage of the transistor 54 is so small with respect to the voltage V across the load 6 that this voltage is approximately equal to:

$$\frac{R_{50}+R_{51}}{R_{51}} \cdot V_{53}$$

In this expression $R_{50}$ and $R_{51}$ are the values of the resistors 50 and 51, respectively, and $V_{53}$ is the voltage across the gas-discharge tube 53. Hence the voltage V is not influenced by fluctuations in the amount of light emitted by the lamp 55 which are independent of the said voltage.

In a practical embodiment resistors 62, 58 and 61 were 15 ohms, 150 ohms and 150 ohms, respectively. The photosensitive resistor 10 was of an experimental type. The resistor 64 was 2 ohms and the resistors 50 and 51 were 15K ohms and 28K ohms, respectively. The resistors 52, 63 and 56 were 470 ohms, 5K ohms and 5.6K ohms, resectively. The capacitors 3 and 4 were 200 μf. and 900 μf., respectively. The load resistance 6 was 320 ohms, the lamp 55 was a filament lamp and the gas-discharge tube 53 a neon lamp. The controlled rectifier 2 was of an experimental type and the transistor 54 was of the type ASZ16. The coils 59 and 60 were 4 mh. each.

When the vltage of the voltage source 1 varied from 190 v. to 260 v. the voltage across the load 6 remained constant at 223 v. within 1 v.

The stabilizing element may be a Zener diode instead of the neon lamp 53.

What is claimed is:
1. A voltage regulating circuit for stabilizing the energy supplied to a load comprising, a source of alternating voltage, controlled rectifier means having first and second electrodes defining a current path therein and a control electrode for controlling the current flow in said path, means connecting said first and second electrodes in series with said load across said AC voltage source, a source of light coupled to said load so as to vary its light output in response to a variation in voltage appearing at the load, and a phase shift network having its input connected to said AC voltage source and its output connected to the control electrode of said rectifier means for supplying an AC control voltage thereto, said phase shift network including only impedance elements that have a current-voltage characteristic that is a continuous function and a photosensitive resistor optically coupled to said light source, said photosensitive resistor being responsive to a variation in said light output to vary the phase of said control voltage in a sense to alter the firing angle of said controlled rectifier means so as to counteract the cause of the variation in the light output of said light source.

2. A circuit as defined in claim 1 wherein said light source comprises a gas discharge tube connected in parallel with the load.

3. A circuit as defined in claim 1 wherein said light source comprises an electric filament lamp connected in series with a Zener diode across the load.

4. A circuit as defined in claim 1 further comprising an amplifier circuit, said light source being connected in said amplifier circuit, a voltage divider connected across the load, and means connecting the input of said amplifier circuit to a tap on said voltage divider.

5. A circuit as defined in claim 4 wherein said amplifier circuit includes an amplifying element having a control electrode connected to said divider tap by means of a series connected voltage-stabilizing element.

6. A voltage regulating circuit for an electrical load comprising, a source of alternating voltage, controlled rectifier means having first and second electrodes defining a current path therein and a control electrode for controlling the current flow in said path, means connecting said first and second electrodes in series with said load across said AC voltage source, a source of light connected across said load so as to vary its light output in response to a variation in voltage appearing at the load, a phase shift network connected to said AC voltage source comprising impedance means for producing a first component of AC voltage, said network further comprising a photosensitive resistor optically coupled to said light source so as to produce a second component of AC voltage that is out of phase with said first voltage component and varies in response to a variation in light output of said light source, and means for combining said first and second components of AC voltage and applying same to the control electrode of said rectifier means in a sense to alter the firing angle of said rectifier means to stabilize the load voltage.

7. A circuit as defined in claim 6 wherein said light source comprises an electric filament lamp connected in series with a Zener diode.

8. A circuit as defined in claim 6 wherein said impedance means comprises a resistor and capacitor serially connected across said voltage source and arranged to produce a first component of AC voltage that lags the source voltage by more than 90 degrees, said combining means being arranged to connect said first AC voltage component in series circuit with said second AC voltage component.

9. A circuit as defined in claim 6 wherein said impedance means and said photosensitive resistor are connected in the phase shift network so that said first and second AC voltage components are of substantially the same amplitude but differ in phase by almost 180 degrees.

10. A circuit as defined in claim 6 wherein said phase shift network comprises a resistive voltage divider connected across said voltage source, means connecting said photosensitive resistor in shunt with a portion of said voltage divider, a resistor and capacitor serially connected across said voltage source, a transformer having a primary winding connected to a point on said resistor-capacitor circuit and a secondary winding connected in series with said photosensitive resistor between said control electrode and said first electrode of the controlled rectifier means.

11. A circuit as defined in claim 6 wherein said phase shift network comprises, a transformer having a primary winding connected across said voltage source and first and second secondary windings connected together in series opposition, means connecting said photosensitive resistor in shunt with said first winding, and means connecting said second winding and said photosensitive resistor in series across the control electrode and said first electrode of said controlled rectifier means in a manner such that said first and second AC voltage components are approximately 180 degrees out of phase.

12. A circuit as defined in claim 6 wherein said phase shift network comprises, first and second capacitors connected in series across said voltage source, a transformer having a primary winding in shunt with one of said capacitors and a secondary winding, a resistor, means connecting said resistor and said photosensitive resistor in series across said voltage source, and means, connecting said secondary winding and said photosensitive resistor in series circuit between said control electrode and said first electrode of the controlled rectifier means.

13. A circuit as defined in claim 6 wherein said phase shift network comprises, first and second capacitors connected in series across said voltage source, third and fourth capacitors connected in series across said voltage source, means connecting said photosensitive resistor in shunt with one of said capacitors, and a transformer having a primary winding connected between the junction point of said first and second capacitors and the junction point of said third and fourth capacitors and a secondary winding connected to the control electrode of said controlled rectifier means.

14. A voltage regulating circuit for an electrical load comprising, a source of alternating voltage, controlled rectifier means having first and second electrode defining a current path therein and a control electrode for controlling the current flow in said path, means connecting said first and second electrodes in series with said load across said AC voltage source, a source of light coupled to said load so as to vary its light output in response to a variation in voltage appearing at the load, a phase shift network connected to said AC voltage source including impedance elements exhibiting a generally linear current-voltage characteristic over the operating range of the circuit and a photosensitive resistor optically coupled to said light source connected together to produce a sinusoidal control voltage having a first substantially constant voltage component and a second voltage component that varies in phase in response to a variation in said light output, and means for coupling said control voltage to said control electrode of the rectifier means in a sense to alter the firing angle thereof to counteract said variation in light output.

References Cited

UNITED STATES PATENTS

| | | | |
|---|---|---|---|
| 2,711,505 | 6/1955 | Hoover | 321—13 |
| 2,779,897 | 1/1957 | Ellis | 323—21 |
| 2,808,559 | 10/1957 | Engle | 323—21 |
| 3,249,807 | 5/1966 | Nuckolls | 323—21 |

JAMES W. LAWRENCE, *Primary Examiner.*

C. R. CAMPBELL, *Assistant Examiner.*